United States Patent [19]

Fusari

[11] 4,321,753
[45] Mar. 30, 1982

[54] ELECTRONIC GEAR CHECKER

[75] Inventor: Mario P. Fusari, Leyden, Ill.

[73] Assignee: Illinois Tool Works Inc., Chicago, Ill.

[21] Appl. No.: 192,797

[22] Filed: Oct. 1, 1980

Related U.S. Application Data

[60] Division of Ser. No. 59,827, Jul. 23, 1979, Pat. No. 4,272,891, which is a continuation-in-part of Ser. No. 939,045, Sep. 1, 1978, abandoned.

[51] Int. Cl.³ .................. G01B 7/00; G01B 7/28; G01B 7/30
[52] U.S. Cl. .................. 33/179.5 B; 33/174 L; 364/570
[58] Field of Search .......... 33/174 L, 178 E, 179.5 R, 33/179.5 B, 179.5 C; 73/162; 235/92 MT, 92 DN; 364/560, 570, 572

[56] References Cited

U.S. PATENT DOCUMENTS

| | | | |
|---|---|---|---|
| 2,563,910 | 8/1951 | Bean | 33/179.5 B |
| 3,096,590 | 7/1963 | Stepanek | 33/179.5 R |
| 3,263,163 | 7/1966 | Foster et al. | 324/34 |
| 3,281,665 | 10/1966 | Foster et al. | 324/34 |
| 3,522,524 | 8/1970 | Smith et al. | 324/34 |
| 3,534,482 | 10/1970 | Stepanek et al. | 33/179.5 R |
| 3,712,130 | 1/1973 | Weichbrodt et al. | 33/179.5 R |
| 3,800,423 | 4/1974 | Munro et al. | 33/179.5 R |
| 3,851,398 | 12/1974 | Hilburger | 33/179.5 B |
| 3,900,720 | 8/1975 | Konersmann et al. | 33/179.5 R |
| 3,900,794 | 8/1975 | Bell | 324/142 |
| 3,945,126 | 3/1976 | Bloch | 33/179.5 R |
| 3,950,858 | 4/1976 | Donner et al. | 33/179.5 R |
| 4,056,774 | 11/1977 | Shum | 324/142 |
| 4,070,762 | 1/1978 | Siddall | 33/174 L |
| 4,079,313 | 3/1978 | Callan | 324/142 |
| 4,080,568 | 3/1978 | Funk | 324/142 |
| 4,110,677 | 8/1978 | Boronkay et al. | 323/19 |
| 4,181,958 | 1/1980 | Juengel et al. | 33/174 L |
| 4,184,263 | 1/1980 | Tatsumi et al. | 33/178 E |
| 4,192,321 | 3/1980 | Korber et al. | 128/776 |

FOREIGN PATENT DOCUMENTS 2459678 6/1975 Fed. Rep. of Germany .... 33/178 E

OTHER PUBLICATIONS

"Digital Logic Handbook 1973-1974", 1973, pp. 328, 329.

Primary Examiner—Richard R. Stearns
Attorney, Agent, or Firm—Thomas W. Buckman; Glenn W. Bowen

[57] ABSTRACT

A functional gear checking machine for determining a number of gear characteristics from a composite input signal received from a linear voltage differential transformer is disclosed. The signal from the sensing transformer is coupled to a demodulation circuit which, in turn, is coupled to several types of signal processing circuits, each of which contains a memory, and each of which processes and separates the components of the composite signals in order to provide output signals that are indicative of the desired gear characteristics. The output signals that are developed are a function of the voltage between two reference levels, at least one of which is established by the associated signal processing circuit.

4 Claims, 11 Drawing Figures

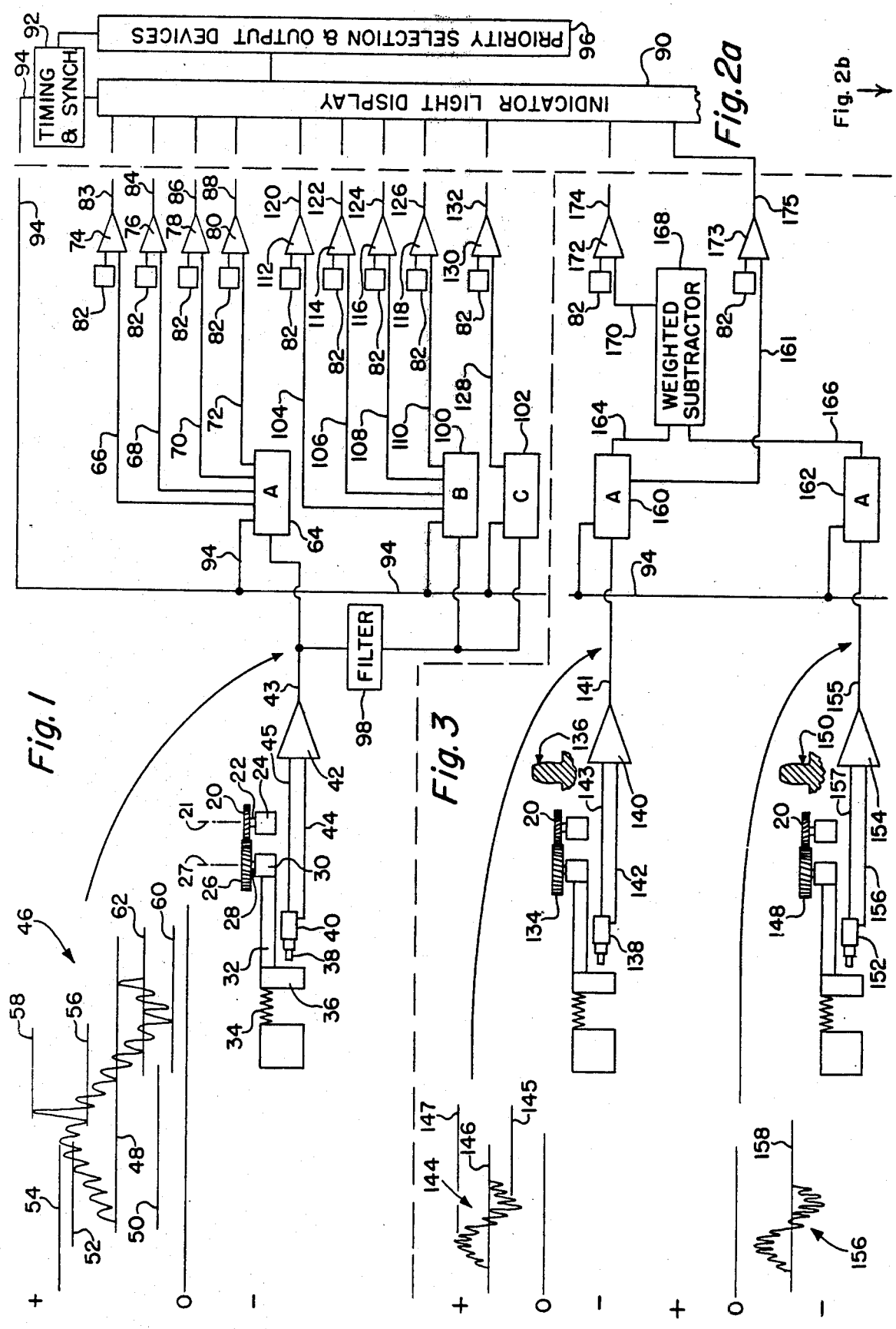

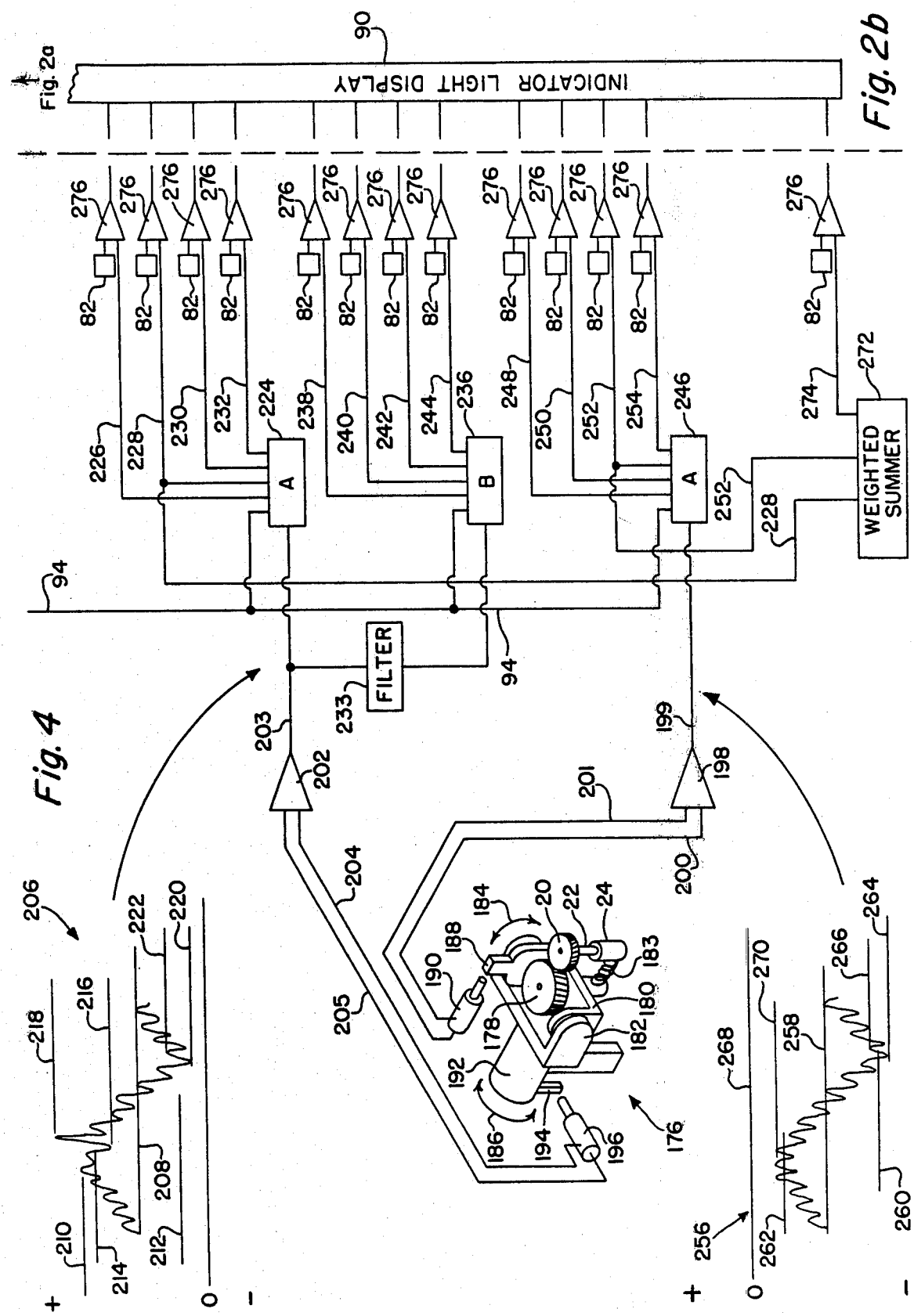

ELECTRONIC GEAR CHECKER

This is a divisional of U.S. patent application Ser. No. 06/059,827, now U.S. Pat. No. 4,272,891, filed July 23, 1979 which is a Continuation-In-Part of abandoned U.S. patent application Ser. No. 939,045 filed Sept. 1, 1978 now abandoned.

BACKGROUND OF THE INVENTION

Electronic gear testing machines are known that are dependent on careful control of the motor speed of the drive motor for functional gear checking in which a master gear is in mesh with the gear under test. Also known are gear checking machines that rely on demodulation and filtering of tooth-to-tooth error signals from the composite error signal, wherein the filtering and demodulation is done under time-dependent conditions.

A gear test machine that was designed to employ analog storage, and to thereby avoid the problems and inaccuracies inherent in the time-dependent demodulation and filtering techniques, is described in U.S. Pat. No. 3,851,398 issued Dec. 3, 1978, in the name of Walter Hilburger. The gear test machine of the Hilburger patent, however, required two sensing devices and two analog storage devices. One of the storage devices was reset after each revolution and, therefore, was associated with the composite error of the gear under test. The other analog storage device was reset by the signal from the other sensor and represented the tooth-to-tooth error of each tooth.

The use of two interrelated sensors and storage devices can introduce an appreciably greater degree of inaccuracy into a gear testing machine than can be achieved if all error signals are detected with independent sensors. The gear checking machine of the present invention is designed to not only avoid the problems found in time-dependent demodulating and filtering systems, but also to provide for the generation of various other types of gear error signals with the high accuracy that is obtainable with the use of independent sensors and permanent storage memories.

DESCRIPTION OF THE DRAWINGS

The present invention is described by reference to the drawings in which:

FIG. 1 is a block diagram of the center distance checking portion of the machine of the present invention;

FIGS. 2a and 2b are block diagrams of the output display section of the machine;

FIG. 3 is a block diagram of the involute measuring section of the machine;

FIG. 4 is a block diagram of the lead and taper measuring section of the machine;

FIG. 5 is a combined block diagram and schematic of the carrier amplifiers and sensors;

FIG. 6 is a combined block diagram and schematic of the type A processing circuits;

TECHNICAL DESCRIPTION OF THE INVENTION

Figure 7:
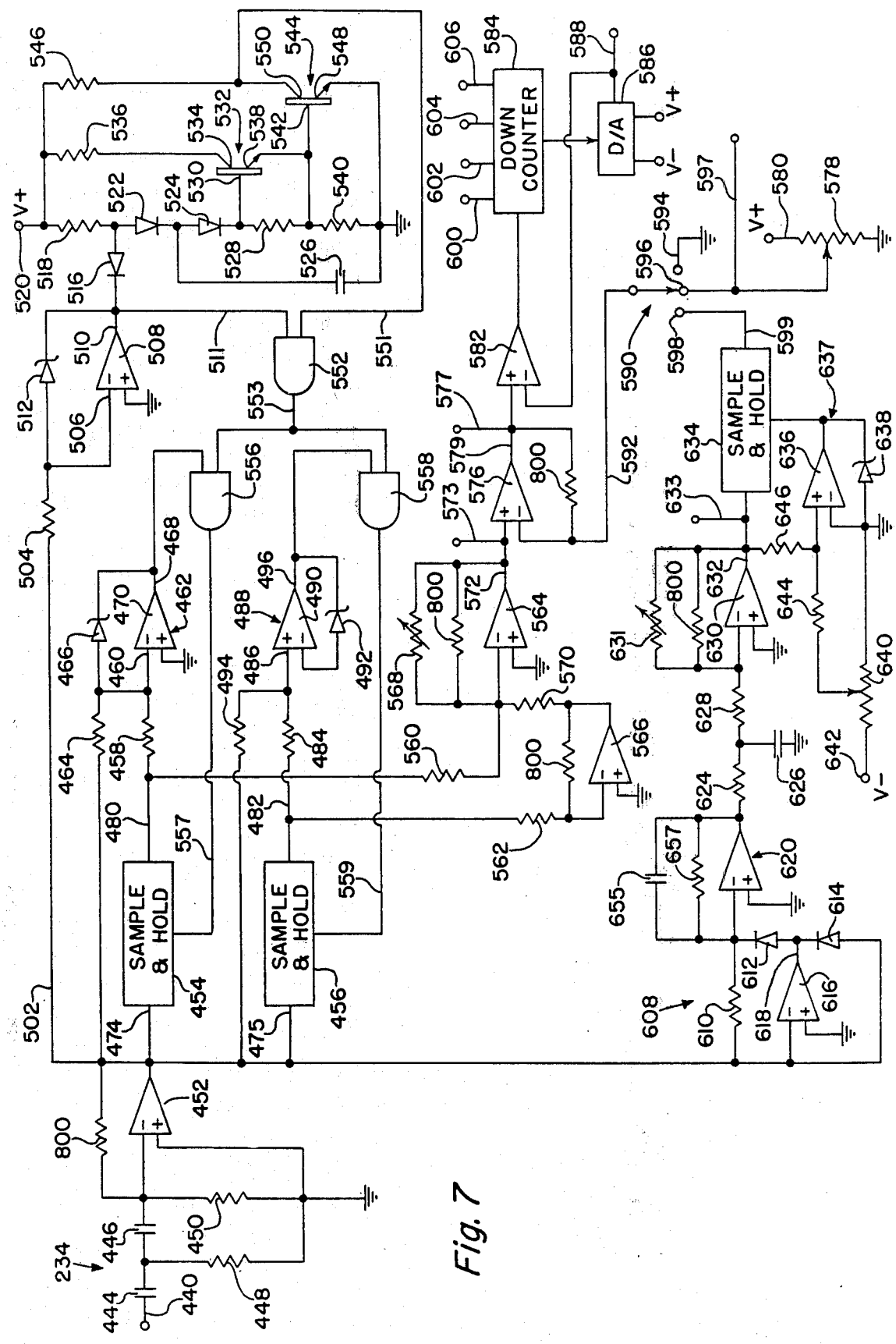
FIG. 7 is a combined block diagram and schematic of the type B processing circuits.

FIG. 1 shows a portion of the gear checking instrument of the present invention which is used to check center distance type errors. The gear 20 which is to be checked is mounted on a spindle 22 which is driven by a drive motor 24. A master gear 26 meshes with the gear 20 that is being checked and is mounted on a spindle 28. The spindle 28 extends from a support member 30 which is supported by a bar 32 so as to be moveable against the action of a spring 34. The particular type of support for the master gear 26 is not an important feature of the present invention and other types of conventional sliding carriages may be employed.

A bar 32 carries an arm 36 that engages the sensing probe 38 of a linear voltage differential transformer (LVDT). The output signal of the LVDT 40 is coupled to a carrier amplifier 42, the details of which are described in more detail subsequently. When the master gear that is mounted on the moveable checking slide is rotated, the change in distance of the gear centers 21, 27 forces the checking slide to move, and the amplitude and frequency of these movements are directly proportional to the errors that are present in the gear being checked. The signal that is thus generated by the LVDT 40, and that is coupled through the carrier amplifier 42, is thus proportional to the "center distance" composite movements of the master gear. When components of this signal are segregated and accurately measured, they will give the magnitude of specific gear features.

The present machine is described by reference to a particular embodiment in which a number of gear features are implemented. However, it will be recognized by one skilled in the art that various other gear features may be readily incorporated into a machine of the type disclosed by use of circuit modifications that will be apparent to those skilled in the art. The gear features that are implemented in the section of the machine associated with FIG. 1 are:
  size of tooth thickness
  total runout or composite error
  sectional runout
  tooth-to-tooth action
  nicks.

The LVDT 40 that feeds the "center distance" signal tooth carrier amplifier 42 may be a conventional sensor of this type with a moving plunger to which a ferrite slug is attached. With the body of the LVDT held stationary, the sensing plunger moves the ferrite slug within the core of a transformer in the LVDT, thereby determining the amount and polarity of the electrical signal that is introduced into the secondary winding of the transformer. The carrier amplifier 42 includes a low impedance power oscillator that supplies a low voltage high frequency signal to the LVDT on the line 44. The line 45 supplies the input signal to the carrier amplifier 42. For example, this signal may be a 2.5 volt A.C. (root means squared) at a frequency of 5,000 Hz to supply the required excitation voltage to the primary winding of the transformer of the LDVT.

The carrier amplifier 42 also includes a demodulator section for demodulating, filtering and amplifying the signal that is received from the LVDT. An output stage to provide a powerful output representing the total composite displacement of the LVDT plunger is also included in the carrier amplifier 42. The output of the carrier amplifier 42 therefore represents the total composite error of the gear, and the various components of the signal generated by this amplifier are shown in the wave form 46.

Separation of the components of the illustrated composite wave form 46 into meaningful gear features may be illustrated by reference to the wave form. A perfect gear would produce an output wave that was a straight line along the horizontal axis indicated by the "0" line. Any particular gear that is being checked may be larger or smaller than desired, and thus an average size signal, as represented as the distance between the "0" axis line and the line 48, may have either a + or − value. The total runout error is illustrated by the distance between the lines 50, 52, which represents the variation of the wave form 46 about the line 48, when the high frequency components are removed. The maximum functional tooth thickness is illustrated by the distance between the "0" reference line and the line 54. In determining the distance the signals due to nicks are filtered out.

The magnitude of a nick is indicated by the distance between the point where the signal for the nick began, as indicated by the line 56, and its maximum peak which is indicated by a line, such as the line 58. Tooth-to-tooth action is indicated between the two peaks associated with a tooth, as represented by the lines 60, 62. The minimum functional tooth thickness is represented by the distance between the "0" reference axis and the line 60. The total composite error is represented by the distance between the lines 58 and 60 and incorporates any signal spikes due to nicks. The gear checking instrument of the present invention is directed to the separation of these various components from the composite wave form 46, so that these values may be recorded and/or used to give an indication when any of these signals exceed a predetermined limit setting that is controlled to indicate the maximum deviation that is allowable for a particular gear.

The output of the carrier amplifier 42 is coupled to a type A processing circuit 64, which is used to separate some of the signal components of the composite wave form 46 that were previously described. For example, the processor 64 provides a signal on its output line 66 which represents the maximum functional tooth thickness, or alternately the maximum size of the gear. The output signal that is produced on the line 68 represents the average functional tooth thickness, or alternately the average size of the gear. The signal that appears on the line 70 represents the composite error, or alternately the runout. The signal that is produced on the line 72 represents the minimum functional tooth thickness, or alternately the minimum size of the gear. (The output lines 66–72 may be used to indicate one or more signals, representing different functions on the same line, by the use of switches in the processor 64, which switch filters in and out of the circuit.)

For example, the line 70 may indicate composite error, or runout according to whether or not high frequency signal components associated with nicks, such as the signal shown between the lines 56, 58, are filtered out or not. The output lines 66–72 are each coupled to an input of the associated comparators 74, 76, 78, and 80. The other input of each of the comparators 74–80 is coupled to a tolerance limit setting potentiometer 82, which achieves the associated desired limit setting. The comparators 74–80 will thus produce an output signal on the output lines 83, 84, 86, and 88 whenever the limit associated with the related comparator is exceeded by the signal on the lines 66–72.

The output signals on the lines 83–88 are coupled to an indicator light display 90, which is illustrated in FIG. 2, comprising FIGS. 2a and 2b. The indicator light display turns on indicator lights that represent to the operator that a particular tolerance limit has been exceeded. The indicator light display 90 is controlled by a timing and synchronization circuit 92. The processor 64 has an internal clock oscillator, and this oscillator may be coupled on the line 94 to the timing and synchronization section 92 so that both the processor 64 and the timing and synchronization circuit 92 may be controlled by the same clock circuit. A priority selection and output circuit 96 is coupled to both the indicator light display 90 and the timing and synchronization circuit 92 so as to select output signals for various control purposes from the signals that are coupled to the indicator light display 90.

The output of the carrier amplifier 42 on the line 43 is also connected to a filter 98 which in turn is connected to a processing circuit 100, which is a type B processing circuit. The filter 98 also supplies a signal to the processor 102, which is a type C, or a different type processor than the processor 64 and 100. The filter 98 is used to remove the D.C. component from the signal that is sent to the processors 100 and 102 so that they may generate their respective output signals. For example, the processor 100 provides a signal on its output line 104, which represents either the maximum tooth-to-tooth action or a nick. The output on the line 106 represents the average tooth-to-tooth rolling action. The output on the line 108 represents the amount that the nick is above (or below, depending on polarity) the average tooth-to-tooth signal. The signal on the line 110 represents the amount the nick is above (or below, depending on polarity) a preset value, which may be determined by the setting of a potentiometer coupled to a D.C. voltage supply in the manner shown by the potentiometer 578 in FIG. 9.

Again, the outputs on the lines 104–110 are each coupled to an associated comparator of the comparators 112, 114, 116, and 118. These comparators all also have one input connected to a tolerance limit setting potentiometer and an associated voltage supply so that an output signal will appear on the respective output lines 120, 122, 124, and 126 when the tolerance limit set by the potentiometer 82 is exceeded. The signals on the lines 120–126 are also coupled to the indicator line display 90. The output of the processor 102 on the line 128 represents sectional runout. This line is coupled to one input of a comparator 130 which also has its other input controlled by a limit setting potentiometer 82. The output line 132 for the comparator 130 is coupled to the indicator light display 90.

In the illustrated embodiments of the present invention, such as FIG. 1, several processors of the same type, such as processors 64, 160, and 162, are illustrated as being the same type of processing circuit. The invention may be implemented in the manner shown, or alternately one processing circuit of a certain type may be used and controlled with switches, in a conventional manner, so that it may be interconnected such as the processor 64 in one instance, and such as a processor 160 or 162 in another instance. If separate processors are used, the processor that is in use at any time should supply the clock signal on its associated output line 94 to the timing and synchronization circuit 92.

The basic arrangement of the gear 20 of FIG. 3 that is being checked and the master gear is the same as that illustrated with respect to FIG. 1, except that different master gears are used. For example, the master gear 134 is constructed so that it engages the gear being tested 20 along the addendum line 136 of the teeth of the gear 20. The output signal that is developed by the LVDT 138, in this case, represents the composite center distance variation at the addendum of the gear. The output of the LVDT 138 is coupled to the carrier amplifier 140 on the line 143. The primary voltage for the LVDT 138 is supplied by the carrier amplifier 140 on the line 142. Again, although an individual LVDT and carrier amplifier are illustrated in FIG. 3, it will be readily apparent to those skilled in the art that the same LVDT and carrier amplifier that were used to achieve the measurements of the portion of the machine, illustrated in FIG. 1, could, by conventional switching techniques, also be utilized in the circuit of FIG. 3.

The composite wave form 144 on the line 141 that is shown in FIG. 3 varies about the line 146 and the distance between the "0" reference axis and the line 146 represents the average size of the gear at addendum. A second master gear 148 engages the teeth of the gear 20 along the dedendum line 150 of the gear teeth. The signal produced by the LVDT 152 is coupled to the carrier amplifier 154 on the line 157, and the carrier amplifier 154 again in turn supplies a drive signal on the line 156 to the primary winding of the LVDT 152. The wave form 156 on the line 155 varies about the line 158, and the distance between the "0" reference line on the line 158 represents the average size of the gear 20 at dedendum. Due to concentricity and to the spacing errors, the composite signal of the wave forms 144, 156 are almost sinusoidal in form, with the peak and valley points representing the largest and the smallest radius values, respectively. In order to measure these values from a reference point, the LVDT's and the carrier amplifier that are used have a bipolar output so that ground is used as a reference level which corresponds to the functional radius of a gear of an average or mean size which has no involute error.

The signals that are produced by the carrier amplifiers 140, 152 represent the average deviations of the addendum and dedendum lines and these are supplied to type A processing circuits 160, 162. Again, the timing and synchronization circuit 92 may receive a clock signal on the line 94 from the processor that is operating in the circuit. The processors 160, 162 have memory facilities for storing the incoming signals so that the same test station may be used to test both for addendum and dedendum variations, if desired.

The processor 160 supplies an output signal on the line 164 which represents the average functional tooth thickness, or alternately the average size of the gear 20 along the addendum line 136 on the teeth of the gear. The processor 162 supplies an output signal on the line 166 which represents the average functional tooth thickness or average size of the gear 20 along the dedendum line 150. The illustrated signal from the carrier amplifier 140 is shown as positive in polarity and the illustrated signal from the carrier amplifier 154 is shown as negative in polarity. These signals are processed by the processors 160, 162 and are coupled to a weighted subtractor circuit 168. (These wave forms 144, 158 may in fact be of either polarity during the testing of a particular gear.) The magnitude of the signals on the lines 164, 166 are subtracted by the weighted subtractor circuit 168 to provide a signal on the output line 170 that indicates the direction of the involute error, and the amplitude of this signal is proportional of the average magnitude of the tooth profile error.

The subtractor circuit 168 may be a conventional weighted subtractor circuit and is constructed to provide weighted subtraction so that magnitude of the subtracted signal is multiplied by a constant, which translates this differential signal between the addendum and dedendum errors into a signal that represents the magnitude of the functional involute error. The weighting constant that is used for this purpose is readily determined by those skilled in the art after consideration of gear specifications and the location on the tooth profile of the two points of contact for which this profile error is to be measured. The multiplication constant is a function of the tangent of the operating tooth profile angle of the gear 148 divided by the tangent of the operating tooth profile angle of the gear 134.

The weighted output signal representative of functional involute error on the line 170 is coupled to one input of a comparator 172. The other input of which is coupled to a tolerance limit setting potentiometer 82 and an associated voltage supply. The output of the comparator 172 on the line 174 thus indicates whenever the tolerance set by the potentiometer associated with the comparator 172 has been exceeded by the error signal on the line 170.

FIG. 4 illustrates a portion of the machine that may be used for the following measurements:
average lead deviation or helix angle
composite lead variation
average taper variations
composite taper variation
gimbal nicks.

FIG. 4, is a block diagram of a portion of the gear checking machine of the present invention which may be used to measure lead and taper errors. In order to provide for this checking, a gimbal checking head 176 is employed. The master gear 178 in this case is supported by a C-shaped yoke 180, which is in turn received into and supported by a second C-shaped yoke 182. The master gear and the gear under check are held together by a spring 183, which is schematically illustrated in FIG. 4, and are rotated in metal-to-metal contact. The gimbal checking head 182 is designed so that the gear 178 is free to rotate in the taper plane direction indicated by the arrows 184, and also in the lead plane direction indicated by the arrows 186. The yoke 180 has a projecting block 188 on it which operates the sensing plunger of a LVDT 190 to provide an output signal that indicates taper plane error. The horizontal spindle 192 connected to the yoke 182 carries a block 194 that engages the plunger of the LVDT 196 so that it provides an output signal indicative of lead plane error. The output of the LVDT 190 is coupled to a carrier amplifier 198 on the line 201, which supplies the primary voltage to the LVDT on the line 200. The output of the LVDT 196 is coupled to a carrier amplifier 202 on the line 205, and the carrier amplifier 202 supplies the primary voltage for the LVDT 196 on the line 204.

The output of the carrier amplifier 202 on the line 203 is the composite wave form signal 206, the various components of which are separated to provide signals representative of particular gear features. The average lead error is indicated by the distance between the "0" reference line and the line 208. The maximum plus lead error, exclusive of nicks, for the wave form 206 is indicated by the distance between the "0" reference line and the line 210. (If the wave form 206 had a negative average lead error, the line 210 would be drawn to indicate the least minus lead error, exclusive of nick signals, of this wave form.) The lead variation error is indicated by the distance between the lines 212 and 214 which represents the distance between the maximum and minimum points of the composite wave form 206, with the high frequency components filtered out.

A nick on the gear 20 that is sensed with the test set up of FIG. 4 will produce a signal such as the illustrated signal which varies between the lines 216 and 218 and is called a "gimbal nick" signal. The line 220 represents the least plus lead error for the wave form 206. (If the average lead deviation were negative instead of positive, this line would indicate the maximum minus lead error.) For the test arrangement of FIG. 4 the tooth-to-tooth action is represented by the distance between the line 220 and 222. The composite lead error signal, which takes into account gimbal nicks, is indicated by the distance between the lines 218 and 220.

The output of the carrier amplifier 202 is coupled directly to the type A processor 224. This processor processes the incoming signal in a manner analogous to the signal processing accomplished by processor 64 so that the output signal on the output line 226 represents the maximum plus, or least minus, lead deviation. The output on the line 228 represents the average lead error. The output on the line 230 represents the lead variation, or the composite, lead error. The signal on the line 232 represents the least plus, or maximum minus, lead error.

The output of the carrier amplifier 202 is also coupled to the filter 233 which is a D.C. blocking filter which eliminates the average size signal component, so that higher frequencies, such as tooth-to-tooth action and nick signals are passed to the processor 236 which is a type B processor. The processor 236 supplies a signal on the output line 238 that represents a gimbal nick or peak tooth-to-tooth action. The output on the line 240 from the processor 236 represents the average gimbal tooth-to-tooth signal. Output line 242 provides a signal representative of the peak signal caused by a gimbal nick above the average tooth-to-tooth level. The output line 244 supplies a signal representative of a gimbal nick or tooth-to-tooth action above a preset value, which may be determined in a convential manner by the setting of a potentiometer coupled to a D.C. voltage supply.

The carrier amplifier 198, which receives the taper plane signal from the LVDT 190 has its output on the line 199 coupled to a type A processor 246. The processor 246 processes the signal that is received to supply an output signal on the line 248 that represents the maximum plus, or least minus, taper error. The output line 250 supplies a signal proportional to the taper variation or composite taper error. The signal on the output line 252 represents the average taper error. The output line 254 supplies a signal representative of the least plus, or maximum minus, taper error. Again, a set of signals, analogous to those previously described, which are provided by processors 64 and 100 may be provided, if desired.

The output signal of the carrier amplifier 198 is represented by the composite wave form 256 on the line 199. It is seen from this wave form that the average taper error is represented by the distance between the line 258 and the "0" reference line. The taper variation signal is represented by the distance between the lines 260 and 262, which is a function of the composite wave form 256 with the high frequency components filtered out. The tooth-to-tooth action that is sensed in the taper plane is represented by the distance between the lines 264 and 266. The composite taper error signal, representing the maximum excursion of the composite wave form 256, is represented by the distance between the lines 268 and 270. The maximum minus, or least plus, taper is represented by the distance between the line 268 and the "0" reference line.

As an optional feature, it is sometimes desired to obtain a signal that is representative of the weighted sum of the lead and taper errors, wherein the weighting factor may be preselected according to the desired purpose. To achieve this, the output line 228 of the processor 224 couples the average lead error signal to one input of a weighted summing circuit 272. The other input of the summing circuit 272 is obtained from the output line 252 of the processor 246 which carries a signal representative of the average taper error of the gear under test.

All of the output lines 226–232, 238–244, and 248–254 and the output line 274, from the summing circuit 272, are coupled to an associated comparator 276. The comparators 276 operate in the same manner as the previously described comparators 74–80, 112–118, 130 and 172 so as to provide an output signal to the indicator light display 90 whenever the input signal on the active line from a processor exceeds the signal supplied by the associated tolerance limit potentiometer 82.

Sectional error processors, such as the processor 102 of FIG. 1, may be added to the processing circuitry of FIG. 4, if desired.

Figures 5, 6:
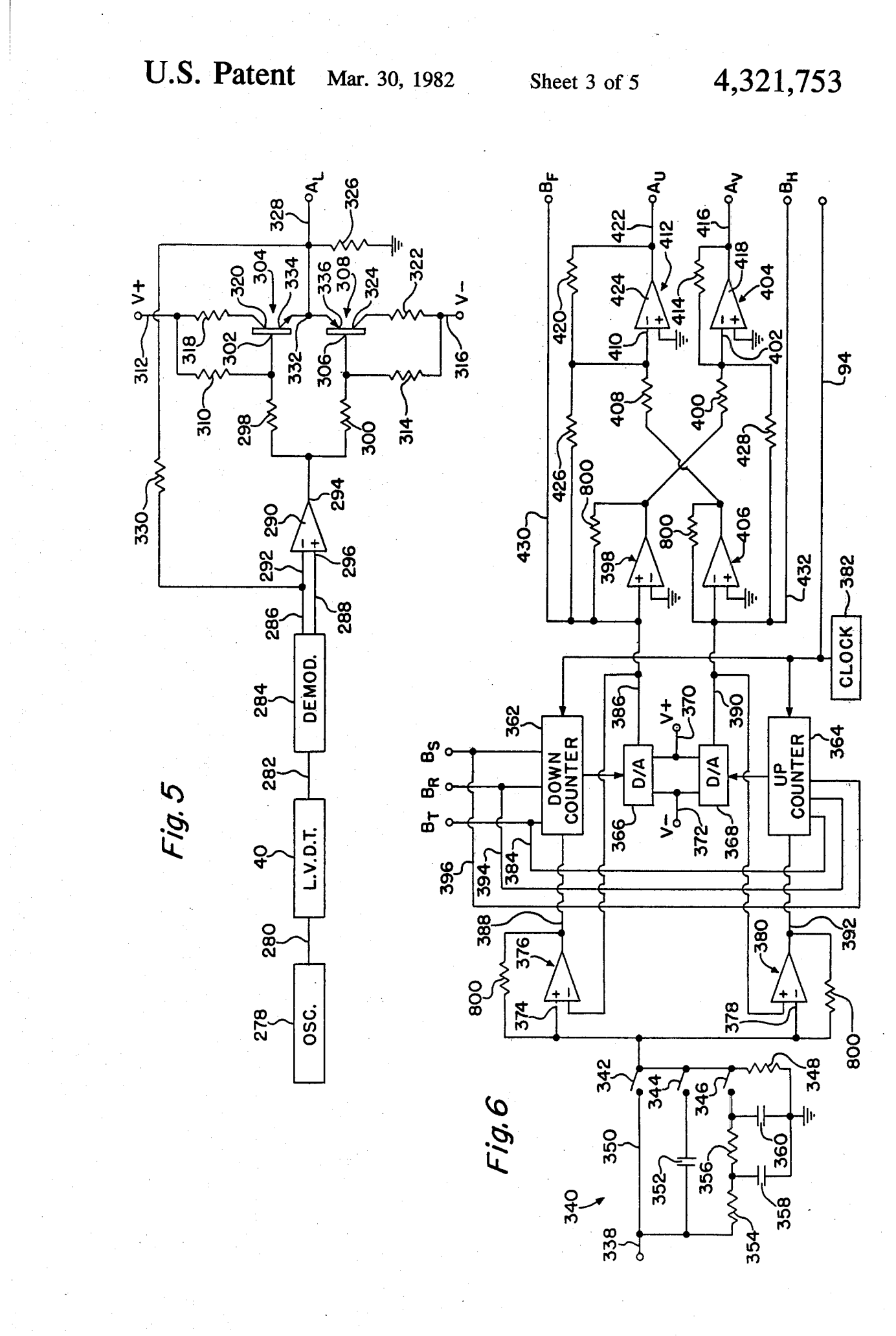

The internal circuitry of the carrier amplifiers 42, 140, 154, 198, and 202 is shown in the combined block diagram-schematic of FIG. 5. Each of the carrier amplifiers is provided with a power oscillator 278. The oscillator preferably also is supplied with automatic gain control, which may be incorporated in a manner well-known by those skilled in the art. The output of the oscillator is a low voltage high frequency signal, and the oscillator itself preferably has a low output impedance. For example, a signal of 2.5 volts A.C. (root means squared) at a frequency of 5,000 Hertz (Hz.) is a suitable signal for most LVDT transducers. This signal is supplied on the output line 280 to the primary winding of an LVDT such as the LVDT 40, for example. The output of the LVDT is taken off of the secondary winding and is supplied on the line 282 to a demodulation circuit 284, in the carrier amplifier which may employ diode demodulation, or any other suitable type of demodulation. The line 286 from the demodulation is coupled to the inverting input terminal 292 of the differential amplifier while the line 288 from the demodulation is supplied to the non-inverting input terminal 296. The difference of the signals on the lines 286, 288 indicate the displacement of the LVDT sensor from a null or zero point.

The output terminal 294 of the difference amplifier 290 is coupled to a pair of current limiting resistors 298, 300, which are connected together at one end. The other end of the resistor 298 is coupled to the base 302 of a NPN transistor 304 while the other end of the resistor 300 is coupled to the base of a PNP transistor 308. A base bias resistor 310 is coupled between the base 302 of the transistor and the terminal 312, which is connected to a positive voltage supply. The base bias resistor 314 is connected to the base 306 of the transistor 308, and at its other end to the terminal 316, which is coupled to a negative voltage supply. The resistor 318, which is connected between the terminal 312 and the collector 320 of the transistor 304, is the collector load resistor for this transistor. The resistor 322, which is connected between the terminal 316 and the collector 324 of the transistor 308, is the collector load resistor for this transistor.

The output load resistor 326 develops the output signal which is supplied on the line 328, which is also labelled $A_L$. A feedback resistor 330 is connected to the summing point 332 of the amplifier. The summing point 332 is the point at which the emitter 334 of the transistor 304, and the emitter 336 of the transistor 308 of the load resistor 326 are connected together. The other end of the resistor 330 is connected to the inverting input terminal 292 of the difference amplifier 290. The combination of the difference amplifier 290, the transistors 304 and 308, the associated resistances and the feedback resistor 330, therefore, provide an operational amplifier circuit. This operational amplifier is capable of receiving low level input signals at the terminals 292 and 296 and of using these signals to control an output signal that has greatly augmented electrical power, and which is capable of variation between the voltage limits established by the power supplies connected to the terminals 312 and 316.

The type A processor, such as the processors 64, 160, 162, 224, and 246, utilizes the circuitry which is shown in greater detail in FIG. 6. The input signal on the line 338 is coupled to a filter network 340, which is associated with three selection switches 342, 344, and 346. Only one of these switches will be closed at a given time, and the signal associated with the selected circuitry will be developed across the load resistor 348. With the switch 342 closed, the input signal on the line 338 passes straight through on the line 350 without modification. When the switch 344 is closed the capacitor 352 is in the circuit, and this acts to block D.C. component of the input signal so that only the A.C. components are passed through. When the switch 346 is closed, the low pass filter consisting of the resistors 354, 356 and the capacitors 358, 360 will be in the circuit. In this case, the ripple components of the input signal are attenuated. The ripple components are all frequencies above 10 Hz., in the disclosed embodiment. These signals are representative of tooth-to-tooth rolling action and nicks.

A successive approximation detection and storage circuit is formed for the incoming signals by two similar circuits including down counter 362, the up counter 364, the digital-to-analog converter 366 that is connected to the down counter 362, and the digital-to-analog converter 368 that is connected to the up counter 364. A positive supply voltage is coupled to the converters 366, 368 from the terminal 370 and a negative supply voltage is coupled to them from the terminal 372. The input signal from the filter 340 is supplied to a non-inverting input terminal 374 of the comparator 376. This same signal is supplied to the inverting input terminal 378 of the comparator 380. A periodic clock pulse signal, which for example may be 200 KHz., is supplied by the clock 382 to the counters 362, 364. The counter 362 is initially set to a predetermined count by the magnitude of a signal on the line 396 that is labelled $B_S$. This signal sets the counter 362 to a predetermined digital count which represents an analog level that is more positive than the most positive-going excursion of the input signal. The signal on the line 396 will set the counter only when the line 384, which is labelled $B_T$ also receives a signal. The counter 362 is initially set for each new gear that is tested by the machine. The digital-to-analog converter 366 translates the initial count in the counter 362 into an analog signal that is more positive than the maximum positive polarity excursion of the incoming signal. As the clock 382 pulses, the counter 362 counts down towards a coded count representative of a zero analog signal level, as defined by the particular digital coding scheme employed. As the counter 362 counts down toward this coded zero count, the voltage translated by the digital-to-analog converter, which is supplied on the output line 386 is also reduced. The output voltage of the converter 366 may change polarity if the counter 362 continues to count down after reaching this coded zero count.

The down counter 362, contains an internal input gate (not shown) which is controlled by the output of the amplifier 376 on the line 388 and the clock 382. (Similar internal gates are found in the other counters of the present invention.) This gate will be open until the input signal to the inverting input 374 of the comparator 376 is equal to the output signal of the converter 366, at which time the internal gate will be closed and the down counter will stop counting, thereby providing a constant output signal on the line 386. Thus, by counting the counter 362 down, while supplying an uninverted input signal to the comparator 376, the converter 366 captures the least negative, or the most positive, excursion of the input signal, depending on the polarity of the input signal.

In a similar manner, the counter 364 is initially set to a coded count which represents a level that is more negative than the most negative-going excursion of the input signal, which in the disclosed embodiment is the negative of the most positive level. The initial setting of the counter 364 is also controlled by the lines 384 and 396. The digital-to-analog converter 368 is coupled to the up counter 364 to decode the count of the counter 364 and to supply an output signal on the line 390. The input to the counter 364 is supplied from the output of the comparator 380 on the line 392. The up counter 364 counts up toward a coded count representative of a zero analog level so that the output voltage on the line 390 of the converter 368 approaches a zero analog level as the counter 364 continues its count. Again, the polarity of the output of the converter 368 may change if the counter 364 continues to count beyond the coded zero count. When the output signal on the line 390 is equal to the input signal on the terminal 378, the internal gate (not shown) of the up counter 364 will be disabled, and the output of the converter 368 will present a signal on the line 390 which represents the input voltage at this point. Thus, the converter 368 will capture the most negative, or least positive, excursion of the input signal, depending on the polarity of the input signal. The line 394, which is also labelled $B_R$, and is coupled to both of the counters 362, 364 supplies an enable signal to enable these counters.

The signal on the output line 386 of the converter 366 is supplied through an inverting amplifier 398 and an input resistor 400 to an inverting input terminal 402 of the summing circuit 404. The output signal on the line 390 from the digital-to-analog converter 368 is supplied through the inverting amplifier 406 and the input resistor 408 on the input line 410 to the inverting input terminal of the amplifier 424 of the summing circuit 412. The resistor 414, which is coupled between the output line 416 and the inverting input terminal 402 of the amplifier 418 is the feedback resistor for the summing circuit 404. In a similar manner, the resistor 420 is coupled between the output line 422 and the input terminal 410 of the amplifier 424. The output line 416 is also labelled $A_V$ while the output line 422 is also labelled $A_U$. The output line 386 is also directly coupled through the resistor 426 to the input terminal 410 of the summing circuit 412. Similarly, the output line 390 is coupled through a resistor 428 to the input line 402 of the summing circuit 404.

The output on the line 422, therefore, is representative of the mean displacement from zero. When the switch 342 is closed, this output line may thus alternately represent either the mean functional tooth thickness, the maximum size, the mean lead error or the mean taper error, in accordance with which one of the A type processing circuits 64, 160, 162, 224 or 246 is under consideration and the position of the switch 342, 344 and 346. When the switch 346 is closed for the processor 64, the output signal on the line 422 will represent the mean size of the gear instead of the mean functional tooth thickness; but the mean lead and taper errors may still be obtained on this line for the processors 224 and 246.

When the switch 342 is closed, the output on the line 416 represents the peak-to-peak variation of the input signal. For the different type A processors involved, this line, therefore, may represent the composite center distance error, or alternately the composite lead error or the composite taper error. When the switch 346 is closed instead, this line will represent runout instead of composite center distance error for the processor 64; but the lead and taper variation may still be obtained on this line for the processors 224 and 246.

A direct output line 430, which is also labelled $B_F$ is connected to the output line 386. Thus, when the switch 342 is closed, this line represents a peak signal which is either the most positive or the least negative variation of the input signal. Thus, the line 430 for the various processors may provide a signal that represents the maximum functional tooth thickness, or maximum positive (or least negative) lead error, or the maximum positive (or least negative) taper error. When the switch 346 is closed, the line 430 may represent a maximum size of the gear for the processor 64.

In a similar manner, an output line 432, which is also labelled $B_H$ is coupled to the output line 390. When the switch 342 is closed, the output line 432 represents the lowermost valley portion of the signal, or in other words, the most negative or least positive excursion. The signal on the line 432, therefore, may represent the minimum functional tooth thickness, or alternately the minimum positive, (or maximum negative), lead error, or the minimum positive, (or maximum negative), taper error. When the switch 346 is closed, line 432 will represent the minimum size of the gear instead of the minimum functional tooth thickness for the processor 64; but this line still will represent the minimum positive or maximum negative lead and taper errors for the processors 224 and 246. Output signals with the D.C. size component filtered out may be obtained by closing switch 344.

Figure 8:
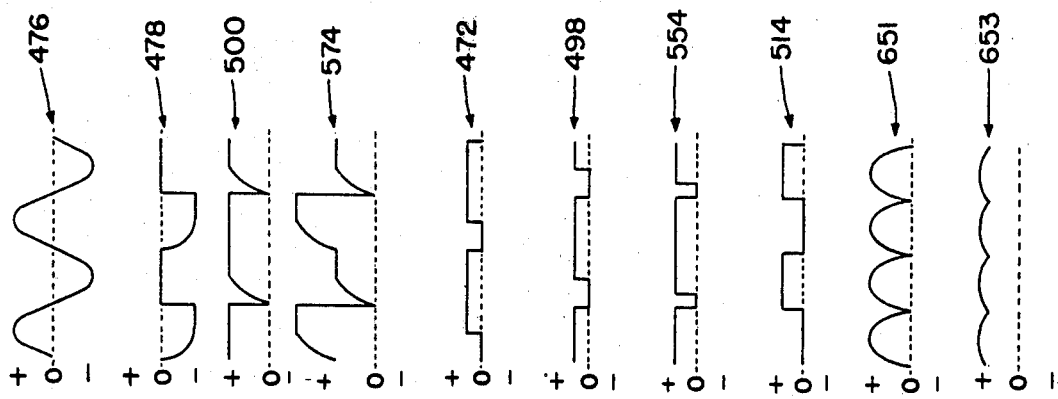
FIG. 8 is a waveform diagram associated with FIG. 7.

The circuitry for the type B processors, such as the processors 100 and 236, is shown in FIG. 7. The wave forms at various points in the circuit of FIG. 7 are illustrated in FIG. 8. The input signal on the line 440 to a type B processor is first passed through a high pass filter 234, which is formed by the capacitors 444 and 446 and the resistors 448 and 450. The output of the filter 234 is coupled to an inverting amplifier 452. The output of the amplifier 452 is supplied to two sample-and-hold circuits 454 and 456. The high pass filter 234 attenuates relatively low frequencies; and, thus, only higher frequencies representative of tooth-to-tooth action and nicks will be passed through this filter. The sample-and-hold circuit 454 samples and stores the positive peaks of the input signal, while the sample-and-hold circuit 456 samples and stores the negative peaks of the input signal.

The output of the sample-and-hold circuit is coupled through the resistor 458 to the inverting input 460 of a summing circuit 462. Another resistor 464 is coupled to the input of the sample-and-hold circuit to supply a second signal from the filter 234 on the input line 460 to the inverting input terminal of the summing amplifier 462. A diode 466, having a characteristic breakdown voltage, which is preferably a Zener diode, is coupled between the input line 460 and the output line 468 of the amplifier 470 that is employed in the summing circuit 462. The Zener diode 466 provides for output clamping so that a pulse signal on the output line 468 will go from a level near ground to a positive voltage level, and will remain at that level until the input signal is below a predetermined level whenever the sum of the input current signals through the resistors 458 and 464 exceed a predetermined level. The wave form 472 of FIG. 8 illustrates the signal that appears at the output line 468 for the wave form signals shown in FIG. 8.

The input signal that appears on the input lines 474 and 475 of the sample and hold circuits 454 and 456 will approximate a sinusoidal wave form, due to the tooth spacing errors. This input signal to the inverting amplifier 452 is represented by the wave form 476 of FIG. 8. The sample-and-hold circuit 454 is constructed to store the positive-going portion of the inverted wave form 476, and, hence, the wave form 478 appears on the output line 480. The wave form 472 correspondingly appears on the output line 468, that is connected to one input of the AND gate 556, in order to allow the sample-and-hold circuit 454 to track the input signal to its most positive level. The sample-and-hold circuit 456 supplies its output on the line 482 through the input resistor 484 on the input line 486 to the non-inverting input terminal of the amplifier 490 of the summing circuit 488. The sample-and-hold circuit 456, thus, tracks the input signal to its most negative level. The clamping diode for the summing circuit 488 is the Zener diode 492.

The input current from the amplifier 452 is also passed through the resistor 494 to the non-inverting input terminal of the amplifier 490. The output signal that appears on the output line 496 of the summing circuit 488, is therefore, represented by the wave form 498 of FIG. 8, while the wave form that appears on the output line 482 of the sample-and-hold circuit 456 is the wave form 500. The output of the amplifier 452 is also coupled on the line 502 through the resistor 504 on the input line 506 to the inverting input terminal of a zero-crossing detector 508 which is employed to detect whenever the input wave form 476 crosses zero, at which time, the signal output on the output line 510 of the amplifier 508 will change levels. The clamping diode 512 is employed to provide pulse output signals on the line 510, as shown by the wave form 514 of FIG. 8.

One end of the resistor 518 is coupled to a terminal 520 which is connected to a positive polarity voltage supply. The anode of a diode 522 is connected to the junction of the other end of the resistor 518 and the anode of the diode 516. The cathode of the diode 522 is connected to the anode of another diode 524 and to one terminal of a capacitor 526, the other terminal of which is connected to ground. The cathode of the diode 524 is connected to one end of a resistor 528 and to the base 530 of an NPN transistor 532. The collector 534 is connected to a resistor 536 which in turn is connected to the terminal 520. The emitter 538 of the transistor 532 is connected to a load resistor 540 and to the base 542 of another NPN transistor 544.

By connecting the emitter 538 of the transistor 532 to the base 542 of the transistor 544, in the disclosed manner, a substantial current gain may be obtained. The load resistor 546 for the transistor 544 is connected to the terminal 520, and the emitter 548 of the transistor 544 is grounded. Thus, when the wave form 514 on the terminal 510 is at a ground level, the anode of the diode 516 will be substantially at a ground level and this will reduce the potential at the base 530 to the point where the transistor 532 is cut off. A positive voltage will, therefore, appear on the collector 550 of the transistor 544. However, when the wave form 514 on the output terminal 510 goes to a positive level, the diode 516 will be reversed-biased, allowing the base 530 of the transistor 532 to go to a high enough positive potential (after a predetermined time delay) so that sufficient current will be supplied to the base 542 to drive it into saturation.

The signal on the output line 510 of the amplifier 508 is coupled on the line 511 to one input terminal of an AND gate 552, the other terminal of which is coupled on the line 551 to the collector 550 of the transistor 544. Thus, when the wave form 514 initially goes to a positive level on the output terminal 510, positive voltage signals will be present at both input terminals of the gate 552, due to the RC time constant established by the capacitor 526 and the associated circuit resistance. The output signal from the collector 550 will thus be at a positive level only for a short time, as determined by the RC time constant. The wave form 554 represents the output of the gate 552 which shows that both inputs to the gate 552 are of a positive or "1" level, only until the capacitor 526 is sufficiently charged to drive the transistor 544 into saturation. The output of the gate 552 is coupled on the line 553 to an input terminal of each of the gates 556 and 558. The other input of the gate 556 is coupled to receive the signal on the output line 468 of the summing circuit 462, while the other input of the gate 556 is coupled to receive the signal on the output line 496 of the summing circuit 488. The output of the gate 556 is coupled on the line 557 to the sample-and-hold circuit 454 to provide a cyclic resetting pulse each time the input wave form 476 crosses zero on a transition from a positive to a negative voltage. The gate 558 similarly supplies a resetting pulse on the line 559 to the sample-and-hold circuit 456.

The sample-and-hold circuits 454 and 456 are respectively coupled through the resistors 560 and 562 to the inverting input terminals of the amplifiers 564 and 566, respectively. The amplifier 564, like most of the amplifiers described herein, may have an external remote gain control resistor, such as the adjustable resistor 568, as an optional feature, if desired. The output of the amplifier 566 is coupled through the resistor 570 to the inverting input terminal of the amplifier 564. The output of the amplifier 564, thus, represents the addition of the inverse of the wave form 478 and the wave form 500. Therefore, the peak-to-peak wave form which appears on the output line 573 of the amplifier 564 is represented by the wave form 574 of FIG. 8. The wave form 574, which is of a positive polarity, is coupled to the non-inverting input of an amplifier 576, the gain of which may be controlled by a potentiometer 578 which is coupled to a positive voltage supply on the terminal 580. The signal on the output line 577 from the amplifier 576 that may represent either a peak-to-peak above average signal or a peak-to-peak above a set value according to the setting of the switch 590.

The switch 590 is shown as being connected to supply the tapped-off voltage from the potentiometer 578 on the line 592 to the inverting input terminal of the amplifier 576. If desired, however, the switch 490 may also be connected to the contact 594, in which case the output on the line 588 would represent a maximum peak-to-peak signal rather than the maximum peak-to-peak signal above the set value, provided by the setting of the potentiometer 578 when the switch 590 is connected to the contact 596. When the switch is connected to the contact 596, the line 597 provides a limited average signal, and when the switch is connected to the contact 598, a maximum peak-to-peak above average value signal is produced on the line 588, in a manner which will be subsequently described.

The down counter 584 has a number of input connections on the lines 600, 602, 604, and 606. The lines 600, 602 and 604 correspond to the lines 384, 394 and 396 of counter 362, respectively. The line 606 is the clock input line. The comparator 582, the down counter 584 and the digital-to-analog converter 586 function in the same manner as the memory circuits that were previously described with reference to FIG. 6. In this instance, however, the down counter 584 is initially set to a coded representative of an analog level that is more positive than the most positive-going excursion of the signal on the line 588. When the signal on the output line 588 is equal to the input signal on the input line 579 to the non-inverting input terminal of the amplifier 582, the counter 584 will be inhibited from further counting and the output line 588 of the converter 586 will thus represent a peak-to-peak value. The output on the line 588 may, therefore, represent a maximum peak-to-peak value or a maximum peak-to-peak value above an average, or alternately a maximum peak-to-peak value above a set value, according to the manner in which the circuit is intended to be used, as determined by the setting of the switch 590.

In order to provide an average voltage to compare with the maximum peak-to-peak voltage at the input of the amplifier 576, the output of the input amplifier 452 is coupled to an absolute value circuit 608, which consists of the resistors 610 and the diodes 612, 614 and the amplifier 616. The output line 618 from the amplifier 616 is connected to the anode of the diode 612 and to the cathode of the diode 614. The absolute value signal from the circuit 608 is supplied to the inverting input terminal of an amplifier 620, which in turn is coupled to an integrating circuit formed of the resistor 624 and the capacitor 626. The output of the amplifier 620 is the absolute value wave form 651 shown in FIG. 8. Additional damping to produce the wave form 653 at the output of the amplifier 620 may be provided by the optional insertion of the capacitor 655 across the feedback resistor 657. The output of the integrating circuit, consisting of the resistor 624 and the capacitor 626, is coupled through an input resistor 628 to an amplifier 630. The amplifier 630 may have a feedback gain adjustment resistor 631, if desired. The combination of the resistor 624 and the capacitor 626 and the amplifier 630 provides a circuit which, through its integrating properties, produces an output signal on the output line 633 of the amplifier 630 that represents the unlimited average value of the input signal from the amplifier 452. This output signal appears on the line 632 and is coupled to a sample-and-hold circuit 634 which samples and holds this average value, and correspondingly provides a signal on the line 599 which represents this value.

An optional limiting summing circuit 637 may be included to restrict the average value stored in the sample-and-hold circuit 634 to a maximum amount. This circuit includes the amplifier 636, the clamping diode 638, the potentiometer 640, which is coupled to a negative voltage supply at the terminal 642, and to the input resistor 646 from the output of the amplifier 630 and the input resistor 644 from the tap of the potentiometer 640. The output of the amplifier 636 supplies a limit, or reset, pulse signal to the gating terminal of the sample-and-hold circuit 634 to achieve the desired limitation of the average signal.

Figure 10:
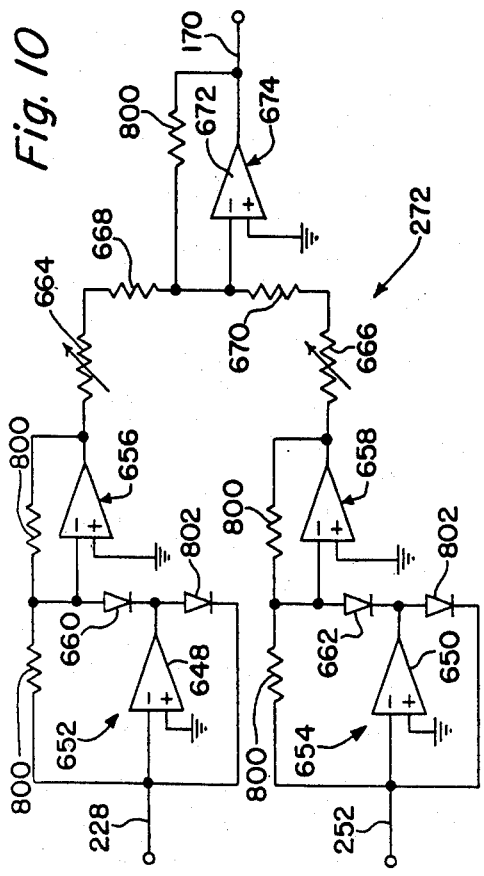
FIG. 10 is a schematic diagram of circuitry that combines the lead and taper error signals.

In order to obtain a weighted summation of the composite lead and taper error signals of FIG. 4, these signals are supplied on the lines 228 and 252 of FIG. 10 to the absolute value circuits 652 and 654 of the weighted summer circuit 272. The outputs of these amplifiers are coupled to the anodes of the diodes 660 and 662. The absolute value circuits 652 and 654 operate in the manner of the previously described absolute value circuit 608 but with a reversed polarity output signal. The outputs of the amplifiers 656 and 658 are coupled through the adjustable resistors 664 and 666, respectively, and also through the resistors 668 and 670, respectively, to the inverting input terminal of an amplifier 672. The input resistors and amplifier 672, therefore, form a summing circuit 674 which generates an input signal on the line 170 which represents a composite lead and taper error that is thus provided with a weighting factor, so that one or the other of these error signals may carry a stronger weight, as desired, in accordance with the setting of the resistors 664 and 666. It is obvious that the weighted subtractor 168 of FIG. 3 may be constructed in an analogous manner, and also that any of the various signals produced in this checking machine may be combined, (or stored and later combined), in weighted, or unweighted, subtractor or summer circuits, if desired.

Figure 9:
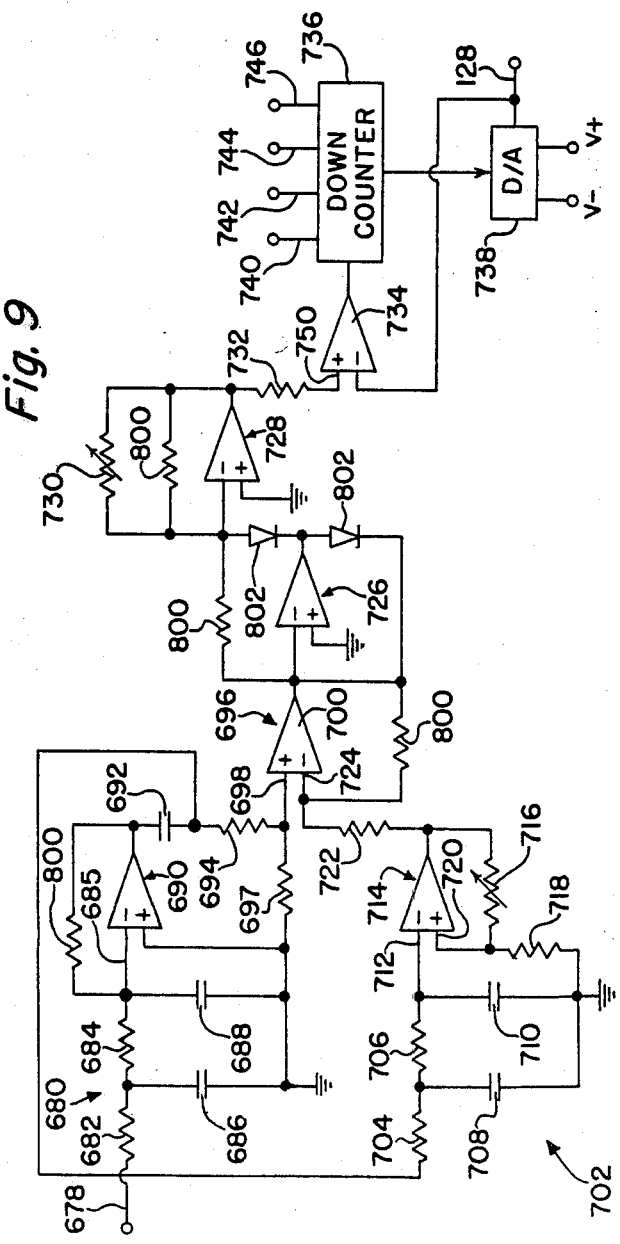
FIG. 9 is a combined block diagram and schematic of the type C processing circuit of the present invention.

The type C processor 102 is shown in more detail in FIG. 9. The input to this processor is taken on the line 678 from the low pass filter 680 which consists of the resistors 682, 684 and the capacitors 686 and 688. The output of the filter 680 is coupled on the line 685 to the inverting input terminal of an amplifier 690. The output of the operational amplifier 690 is coupled through a capacitor 692 and a resistor 694 on the line 698 to a comparison circuit 696 via the inverting input terminal of the amplifier 700. The capacitor 692 serves to block out the D.C. component of the composite signal so as to eliminate gear size from affecting signals processed by this circuit. The signal through the resistor 694 is also fed back through the feed back resistor 697 to the non-inverting input terminal of the amplifier 690. The capacitor 692 is also coupled to an integrating circuit 702, which consists of the resistors 704, 706 and the capacitors 708 and 710. The purpose of this integrator is to provide a phase-shift of substantially 90° from the signal appearing at the input terminal 698. This phase-shifted signal is supplied on the line 712 to the non-inverting input terminal of the amplifier 714. The feedback resistor 716 is preferably adjustable to achieve the correct 90° phase shift, and a stabilizing resistor 718 is connected between the inverting input terminal 720 and ground.

The phase shifted output signal from the amplifier 714 is coupled through the resistor 722 on the line 724 to the inverting input terminal of the comparison circuit 696. The output of this comparison circuit, therefore, provides a comparison between the shifted and the unshifted composite error signals, with the high frequency components removed. This signal is used to detect the amount of sectional deviation that occurs in the runout error segment within each 90° segment of relative rotational movement to the master and test workpieces, or gears. If desired, of course, other amounts of phase shift other than 90° could be employed.

The output of the comparison circuit 696 is coupled to an absolute value circuit 726, which is constructed in the same manner as the absolute value circuits 652 and 654 in the illustrated embodiment. The signal is then coupled through an inverting amplifier 728, which has an optional gain adjustment resistor 730, and the resistor 732 to the non-inverting input terminal of the amplifier 734. The amplifier 734 is connected to a down counter 736, and the down counter is connected to a digital-to-analog converter 738. The combination of the amplifier 734, the down counter 736 and the digital to analog converter 738 functions in the same manner as the previously described successive approximation circuits that also employed down counters. The input lines 740, 742, 744, and 746 to the down counter 736 correspond to the input lines 600, 602, 604, and 606, respectively, to the down counter 584.

The down counter 736 is set initially to a coded count which represents an analog level that is more positive than the most positive-going excursion of the signal from the amplifier 728. The counter 736 counts down and the digital to analog converter 738 converts this count to a corresponding analog voltage level until the signal on the output line 128 or the digital-to-analog converter 738 is equal to the input signal on the input line 750 to the non-inverting input terminal 750 of the amplifier 734. When these two signals are equal, the internal gate of the down counter is disabled and the voltage displayed by the converter 738 and the output line 128 represents the maximum sectional deviation for the phase-shift selected.

Because of manufacturing inaccuracies or distortions, a gear can have the pitch line perfectly concentric to the mounting shaft or hole, but with groups of thin and thick teeth at the addendum only. In a planetary carrier assembly with floating ring gear, these imperfections will cause the mating gear to change its angular velocity which can shorten the functional life of the gear and can generate noise. For this reason it may be desired to include additional circuitry in the functional workpiece checking machine of the present invention to sense the runout, or angular velocity, component associated with the addendum line of the teeth of a gear.

The runout along the addendum line of the test gear 20 is represented by the distance between lines 145 and 147 on the wave form 144 of FIG. 3, which again represent the signal variation that is sensed with the high frequency components removed. This signal is processed by the processor 160 to provide a runout signal on the line 161, in the same manner that the processor 64 provides its corresponding runout signal on the line 70. The line 161 is coupled to one input of a comparator 173 that has its other input coupled to a limit setting potentiometer 82 so as to provide an output signal on the line 175 to the indicator light display 90 whenever the limit associated with this comparator is exceeded.

The successive approximation detection and storage circuits that have been described above are constructed in a manner similar to conventional successive approximation analog-to-digital converters. In the conventional A/D converter, an analog level of a relatively constant value is provided to one input of the comparison circuit and a second analog signal level that is decoded from the count of a digital counter is provided to the other input of the comparison circuit. The counter then counts from a zero count toward this constant level and stops counting when the two analog signals are equal. The digital value of the counter is then utilized as the output signal.

The present invention utilizes successive approximation circuitry in an entirely different way. The successive approximation circuits of this invention are not used to produce a digital output signal that is a translation of a relatively constant analog input signal. Instead, the successive approximation circuitry of the present invention is used as analog signal peak and valley detection and storage units that provide for storage of these values until they are required for use. This, thereby, avoids the detrimental effects of short term storage due to charge decay that accompany conventional analog storage circuits when the signal must be stored for relatively long times, such as for a complete revolution of a workpiece or a gear under test. The successive approximation circuit of the present invention, therefore, are not used, for conventional analog-to-digital conversion; but, instead they are used for detection of the maximum and minimum levels of an analog signal and for permanent, (until required by external equipment), storage of these levels.

All feedback resistors for operational amplifiers that have not been specifically described above have been labelled 800 in the Figures, and all of the diodes in the absolute value circuits that have not been specifically described above have been labelled 802. In the operation of the counters of the successive approximation circuitry, the counters for example may contain 12 bits, and all of the bits of a down counter may be set to a "1" level while all of the bits of an up counter may be set to a "0" level. The count representative of a zero analog output voltage then will occur when all of the count stages of the counter except the most significant bit stage are set at a "1" level.

I claim:

1. The use of successive approximation means in a system which produces an analog electrical signal that undergoes an analog signal excursion of a maximum magnitude in a particular direction from a reference level comprising the steps of establishing a stored digital count that is translatable into an initial analog signal level that is of a greater magnitude in said particular direction than said excursion, reducing said digital count in said particular direction in digital steps until it is translatable into a reduced analog signal level that is approximately equal to said excursion and producing an output that represents the value of said reduced analog signal level.

2. The use of successive approximation means as in claim 1 comprising the additional step of processing said analog signal levels so that they are always of single predetermined polarity.

3. The use of successive approximation means in a system which produces an analog electrical signal that undergoes a first analog signal excursion of a maximum magnitude in a first direction from a reference level and a second analog signal excursion of a maximum magnitude in a direction opposite to said first direction from said reference level comprising the steps of establishing a first stored digital count that is translatable into a first initial analog signal level that is of a greater magnitude than said first excursion in said first direction, establishing a second stored digital count that is translatable into a second initial analog signal level that is of a greater magnitude than said second excursion in said opposite direction, reducing said first digital count in said first direction in digital steps until it is translatable into a first reduced analog signal level that is approximately equal to said first excursion, reducing said digital count in said opposite direction in digital steps until it is translatable into a second reduced analog signal level that is approximately equal to said second excursion and producing first and second outputs that represent said first and second reduced analog signal levels, respectively.

4. The use of successive approximation as in claim 3 comprising the additional step of establishing said reference level so that said first and second excursions are of a single predetermined polarity.

* * * * *